United States Patent [19]

Davidson et al.

[11] 4,134,431

[45] Jan. 16, 1979

[54] METHOD OF AND APPARATUS FOR MOLDING SPIGOT RINGS ON PIPE SECTIONS AND PRODUCT OF THE METHOD

[75] Inventors: Franklin E. Davidson; Lee E. Pearson, both of Conroe, Tex.

[73] Assignee: Owens-Corning Fiberglas Corporation, Toledo, Ohio

[21] Appl. No.: 795,835

[22] Filed: May 11, 1977

[51] Int. Cl.² .......................... B29C 1/00; B29C 5/00; B29D 23/02; B29D 23/08

[52] U.S. Cl. .................................. 138/109; 138/173; 264/271; 264/275; 264/328; 285/291; 285/351; 425/127; 425/129 R; 425/812; 425/DIG. 44

[58] Field of Search ................ 264/219, 250, 255, 259, 264/267, 271, 275, 328, 329, 261–263; 425/129 R, 812, DIG. 44, 127; 285/288, 291, 351; 138/109, 173

[56] References Cited

U.S. PATENT DOCUMENTS

| | | | |
|---|---|---|---|
| 483,593 | 10/1892 | Wilbur | 285/292 |
| 1,151,615 | 8/1915 | Putnam | 285/292 |
| 2,580,668 | 1/1952 | Franz | 249/100 |
| 2,706,498 | 4/1955 | Upson | 285/292 |
| 2,766,484 | 10/1956 | Sanderson | 425/812 |
| 2,966,317 | 8/1961 | Kibbie et al. | 285/231 |
| 3,026,575 | 3/1962 | Lusher et al. | 264/261 |
| 3,087,201 | 4/1963 | Williams et al. | 264/328 |
| 3,741,707 | 6/1973 | Bauman et al. | 164/299 |
| 3,777,000 | 12/1973 | Kusenberg et al. | 264/328 |
| 3,863,701 | 2/1975 | Niimi et al. | 164/98 |
| 3,888,295 | 6/1975 | Schillinger | 164/98 |

FOREIGN PATENT DOCUMENTS

| | | | |
|---|---|---|---|
| 1198989 | 8/1965 | Fed. Rep. of Germany | 264/271 |
| 10751 of | 1908 | United Kingdom | 285/288 |

Primary Examiner—W.E. Hoag
Attorney, Agent, or Firm—Ronald C. Hudgens; Patrick P. Pacella; Paul J. Rose

[57] ABSTRACT

A pipe section is mounted in a horizontal position and upper and lower halves of a spigot ring mold are clamped to the spigot end. The lower mold half is provided with a port for receiving a nozzle of a hardenable liquid resin supply hose and the upper mold half is provided with vents. Resin is forced into the mold under pressure until some comes out of the vents. After the resin is hardened, the mold is removed.

6 Claims, 4 Drawing Figures

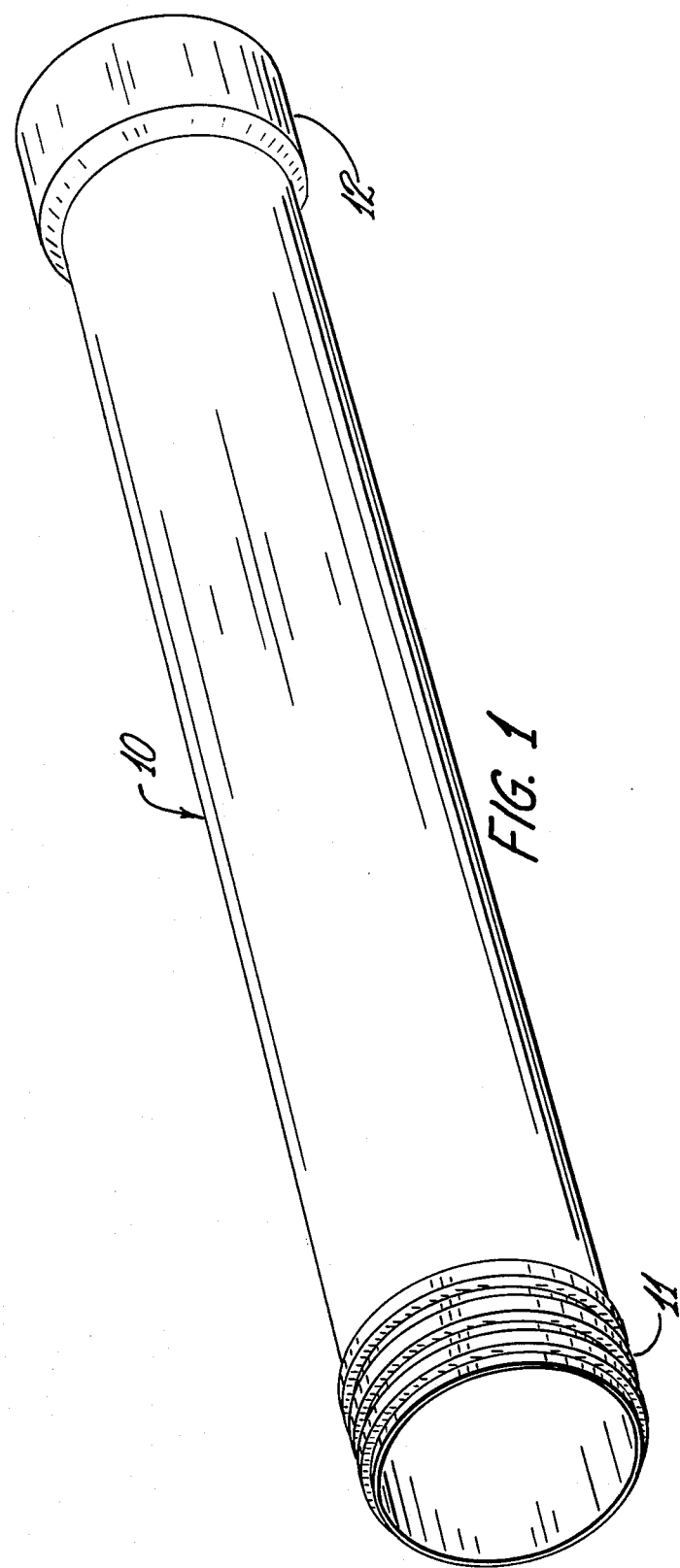

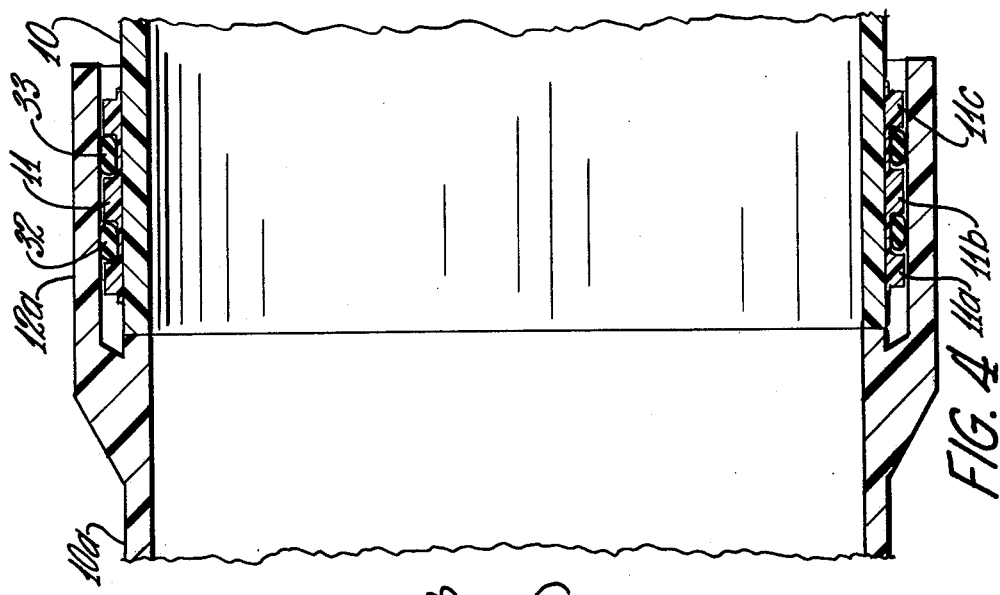
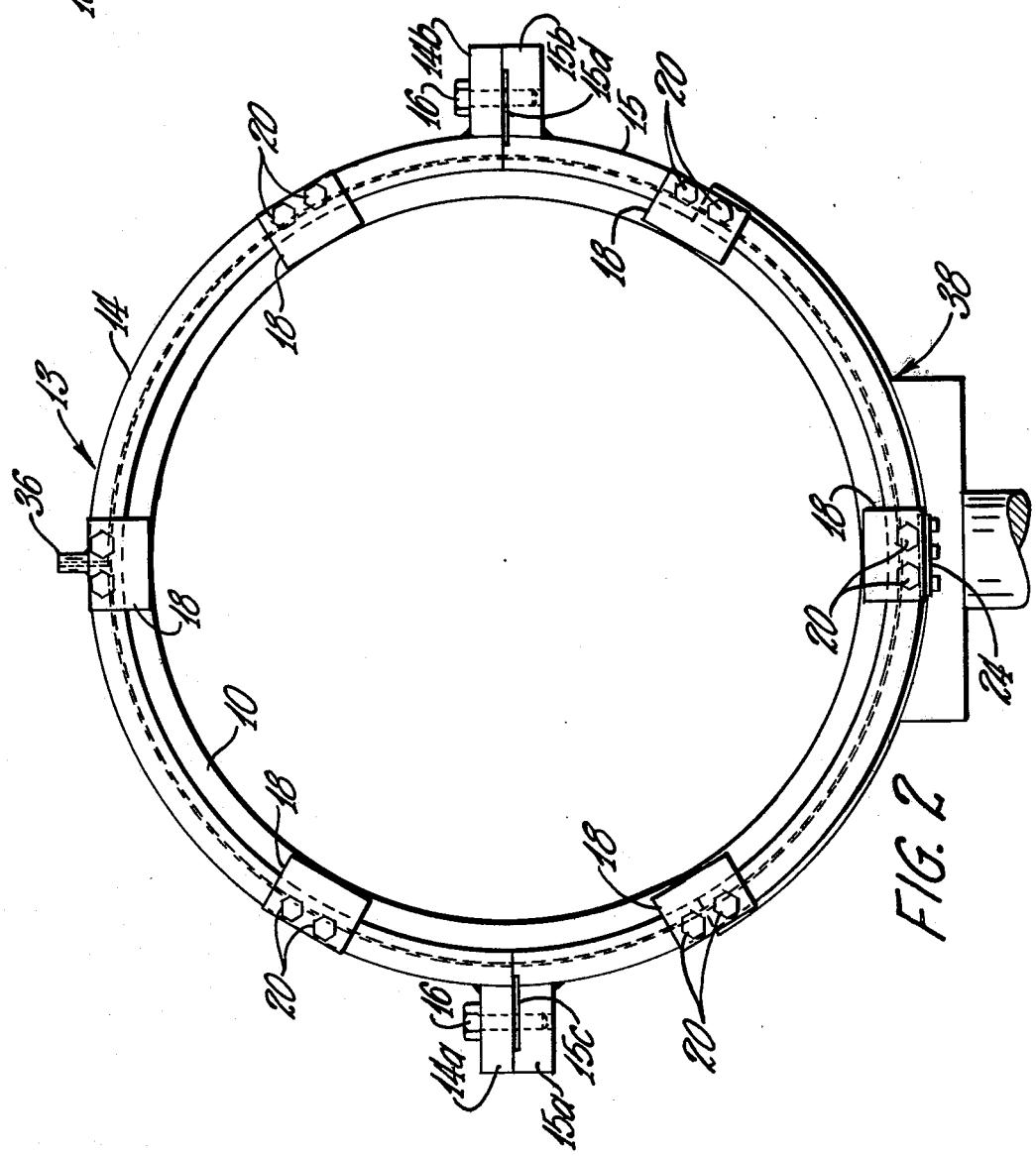

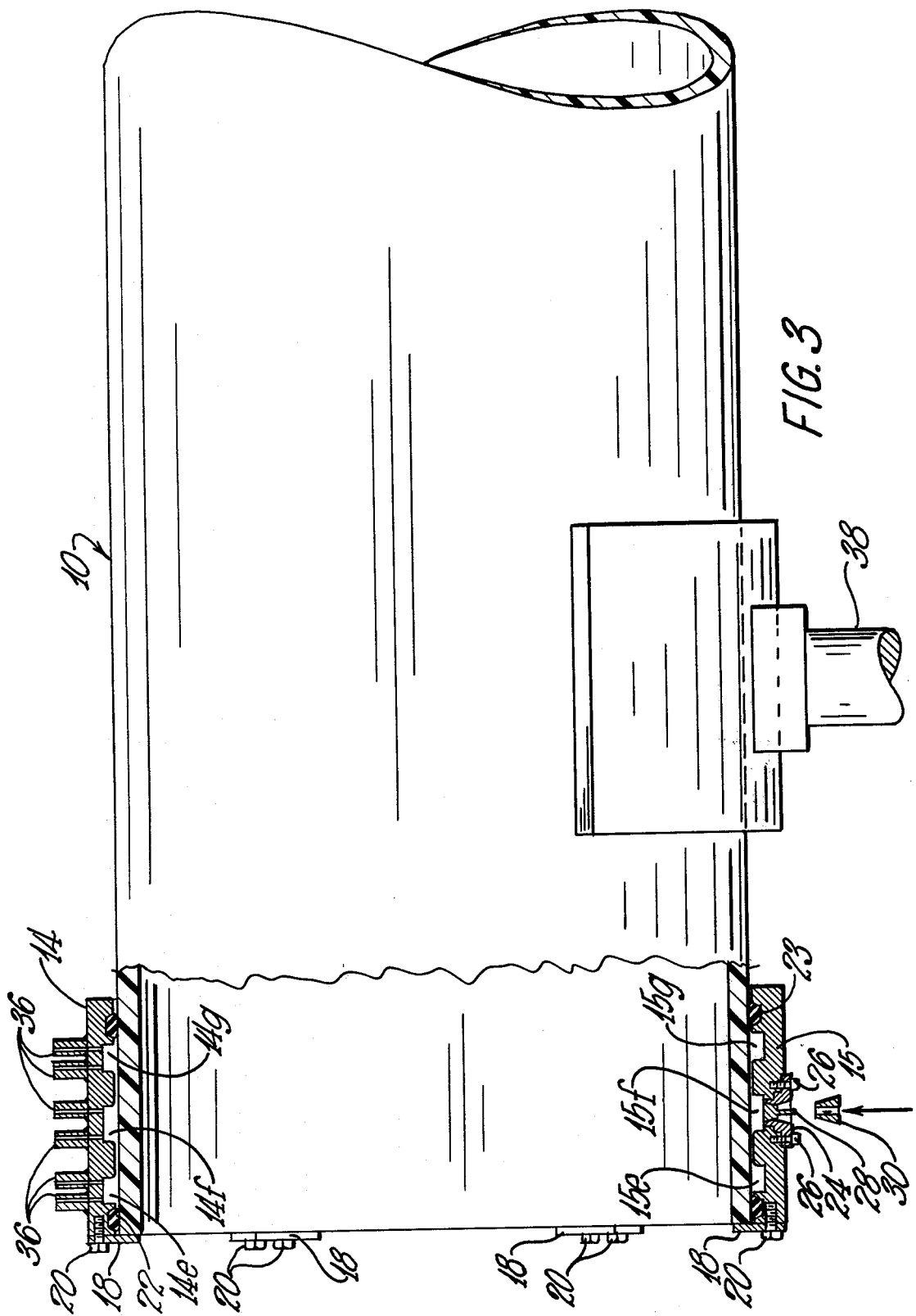

METHOD OF AND APPARATUS FOR MOLDING SPIGOT RINGS ON PIPE SECTIONS AND PRODUCT OF THE METHOD

This invention relates generally to pipe and more particularly to bell and spigot joints between pipe sections. The invention is particularly useful with respect to glass fiber reinforced plastic pipe, which is lighter than concrete pipe and frequently made in sections as much as sixty feet long. For pipe lines intended to carry liquid under pressure or without leakage, such joints are provided with an elastomeric gasket or gaskets disposed in grooves of a molded spigot ring on one pipe section and forcibly retained by the bell end of an adjacent pipe section. Prior to our invention, pipes were set upright on a suitable base, spigot ring mold halves were clamped around the lower end, and the spigot ring material was merely poured in an open top of the mold adjacent the pipe. Such a procedure may be impractical for long pipe sections.

An object of the invention is to provide an improved method and apparatus for molding spigot rings on pipe sections.

Other objects and advantages will become apparent when the following specifications is considered along with the accompanying drawings in which:

FIG. 1 is a perspective view of a section of pipe having a spigot ring molded on an end portion thereof in accordance with the invention;

FIG. 2 is an end view of a pipe section with the spigot ring mold of the invention clamped thereon;

FIG. 3 is a fragmentary longitudinal view, partly in section, of the pipe section and mold of FIG. 2; and FIG. 4 is a fragmentary longitudinal sectional view of a bell and spigot joint including a spigot end portion of a pipe section having a spigot ring molded thereon in accordance with the invention and a bell end portion of an adjacent pipe section.

With respect to the drawings, a length or section of pipe 10 having a spigot ring 11 molded on one end portion thereof in accordance with the invention and a bell 12 on the other end portion is shown in FIG. 1. Preferably the pipe 10 is made of glass fiber reinforced thermosetting resin on a machine having a mandrel surface provided by a continuously recirculating helical band as disclosed in U.S. Pat. No. 3,679,521 issued July 25, 1972.

FIGS. 2 and 3 show a spigot ring mold 13 clamped on the spigot end portion of a pipe section 10 before the molding of the spigot ring 11 of FIG. 1. The mold 13 includes an upper generally semi-cylindrical mold half 14 and a lower generally semi-cylindrical mold half 15. The mold half 14 is provided with a pair of opposite extending clamping lugs 14a and 14b. The mold half 15 is provided with a pair of oppositely extending clamping lugs 15a and 15b clamped respectively to the lugs 14a and 14b as shown in FIG. 2 by means such as bolts 16 extending respectively through the lugs 14a and 14b and threaded respectively into the lugs 15a and 15b. The lugs 15a and 15b are provided respectively with recesses 15c and 15d on their upper surfaces to increase the clamping pressure between the semi-cylindrical mold halves 14 and 15. Each of the mold halves is provided on an end face with a plurality of stop plates 18 each secured by a pair of bolts 20. The stop plates 18 locate the mold 13 along the length of a pipe section 10 as best shown in FIG. 3.

Before the mold halves 14 and 15 are clamped on the pipe 10, two elastomeric mold sealing rings 22 and 23 are installed on the pipe in proper position for clamping in internal grooves in the mold halves respectively adjacent opposite end faces. The lower mold half 15 is machined centrally of the bottom to receive an injection port fitting 24 secured in place by a plurality of screws 26. A displaceable plug 28 permits injection of resin into the mold 13 through the injection port fitting 24, but acts as a check valve to prevent resin in the mold from running back out. An injection nozzle 30 connected to a pressurized resin supply (not shown) is adapted to seat tightly against the fitting 24 in a conical recess thereof.

The mold halves 14 and 15 are shaped on their inner peripheries adjacent the pipe 10 to provide a spigot ring 11 (FIG. 4) on the pipe having two spaced annular exterior grooves in which two elastomeric annular gaskets 32 and 33 are respectively received to seal a joint between the spigot ring 11 of the pipe 10 and a bell 12a of an adjacent pipe 10a. The gasket 32 is confined between raised ring portions 11a and 11b of the spigot ring and the gasket 33 is confined between raised ring portions 11b and 11c of the spigot ring.

The upper mold half 14 is provided with interior grooves 14e, 14f, 14g (FIG. 3) and the lower mold half 15 is provided with similar grooves 15e, 15f, and 15g in which the ring portions 11a, 11b, and 11c are respectively formed. The grooves 14e, 14f, and 14g are each vented at the top with two vents, there being six nipples 36 welded to the upper mold half 14 and each groove being in communication with two of the nipples. Tubes of clear plastic (not shown) may be attached to the nipples 36 to catch resin overflow, the appearance of resin in the tubes indicating that the mold 13 is full.

With the pipe 10 supported horizontally above the floor on a plurality of supports such as a support 38 and with the spigot end portion free, the sealing rings 22 and 23 are put in place. The mold halves 14 and 15 are then placed on the pipe, with the stop plates 18 against the end surface, and clamped together with the bolts 16, care being taken that the rings 22 and 23 are properly seated in their grooves. Hardenable liquid resin, preferably including glass fibers, is then injected through the fitting 24 from the nozzle 30 until some of the resin overflows through the nipples 36. The nozzle 30 is then removed from the fitting 24 and the plug 28 allowed to seat, preventing backflow of the resin. After a period of time, the resin hardens and the mold halves 14 and 15 and the sealing rings 22 and 23 are removed, the spigot ring 11 then being essentially a part of the pipe 10.

Various modifications may be made in the structure shown and described without departing from the spirit and scope of the invention.

We claim:

1. A method of molding a resin spigot ring on an end portion of a section of glass fiber reinforced thermosetting resin pipe to provide a pair of spaced connected exterior raised ring portions defining an annular groove for later reception of an elastomeric annular gasket, the method comprising supporting the pipe section horizontally with the end portion free, applying a pair of elastomeric mold sealing rings to the pipe end portion in spaced relationship to each other and to the respective end face of the pipe, applying upper and lower mold halves to the pipe end portion in predetermined relationship to the respective end face of the pipe section to form a composite mold having a first pair of spaced internal annular grooves respectively adjacent opposite end faces thereof, a second pair of spaced internal annular grooves between the first pair, and an annular portion between the grooves of the second pair having an internal diameter smaller than the diameter of either of the grooves of the second pair but larger than the outside diameter of the pipe while locating the mold sealing rings respectively in the first pair of internal annular grooves of the mold, clamping the mold halves together, injecting hardenable liquid resin through an injection port in the lower mold half until resin overflows through vents in the upper mold half to fill the second pair of internal annular grooves of the mold and the space therebetween adjacent the pipe with the resin, letting the resin in the mold harden, unclamping and removing the upper and lower mold halves from the pipe section, and removing the mold sealing rings from the pipe section.

2. A pipe section having a spigot ring molded thereon by the method of claim 1.

3. For molding a resin spigot ring on an end portion of a section of glass fiber reinforced thermosetting resin pipe having a pair of spaced mold sealing rings thereon, to provide a pair of spaced connected exterior raised ring portions defining an annular groove for later reception of an elastomeric annular gasket after the mold sealing rings have been removed from the pipe section, a composite mold comprising upper and lower generally semicylindrical mold halves adapted to be clamped together around the pipe section over the mold sealing rings for the spigot ring molding operation and unclamped and removed from the pipe section after the spigot ring molding operation, the composite mold having a first pair of spaced internal annular grooves respectively adjacent opposite end faces thereof for respectively receiving the mold sealing rings, a second pair of spaced internal annular grooves between the first pair, and an annular portion between the grooves of the second pair having an internal diameter smaller than the diameter of either of the grooves of the second pair but larger than the outside diameter of the pipe, the second pair of internal annular grooves of the mold and the space therebetween adjacent the pipe being adapted to receive hardenable liquid resin, the lower mold half having a resin injection port communicating with the bottom of one of the second pair of internal annular grooves, and the upper mold half having vents at the top communicating respectively with the second pair of internal annular grooves.

4. A mold as claimed in claim 3 wherein the upper mold half has nipples at the vents for attachment of clear plastic tubing.

5. A mold as claimed in claim 3 wherein each of the mold halves has stop means engageable with an end face of a pipe section to locate the mold half longitudinally thereof.

6. A mold as claimed in claim 5 wherein the stop means is a plurality of stop plates bolted to an end face of the mold half.

* * * * *